United States Patent
Kuehnle et al.

(10) Patent No.: US 7,453,674 B2
(45) Date of Patent: Nov. 18, 2008

(54) METHOD FOR PROTECTING AN ELECTRIC GENERATOR

(75) Inventors: Barry W. Kuehnle, Ammon, ID (US);
Jeffrey B. Roberts, Ammon, ID (US);
Ralph W. Folkers, Ammon, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 11/688,532

(22) Filed: Mar. 20, 2007

(65) Prior Publication Data
US 2008/0232005 A1 Sep. 25, 2008

(51) Int. Cl.
*H02H 7/06* (2006.01)
(52) U.S. Cl. .......................... 361/20; 361/85
(58) Field of Classification Search .............. 361/20, 361/85
See application file for complete search history.

(56) References Cited

U.S. PATENT DOCUMENTS

| 4,229,694 | A | * | 10/1980 | Wilson et al. | ............... | 324/772 |
| 5,361,184 | A | * | 11/1994 | El-Sharkawi et al. | ...... | 361/93.6 |
| 6,324,039 | B1 | * | 11/2001 | Gross, Jr. | ...................... | 361/86 |
| 6,915,186 | B2 | * | 7/2005 | Patterson, Jr. | ............... | 700/286 |
| 7,230,809 | B2 | * | 6/2007 | Whitehead | .................... | 361/62 |
| 7,262,520 | B2 | * | 8/2007 | Nguyen et al. | ................ | 307/86 |

* cited by examiner

*Primary Examiner*—Michael J Sherry
*Assistant Examiner*—Christopher J Clark
(74) *Attorney, Agent, or Firm*—Wells St. John

(57) ABSTRACT

A method for protecting an electrical generator which includes providing an electrical generator which is normally synchronously operated with an electrical power grid; providing a synchronizing signal from the electrical generator; establishing a reference signal; and electrically isolating the electrical generator from the electrical power grid if the synchronizing signal is not in phase with the reference signal.

24 Claims, 7 Drawing Sheets

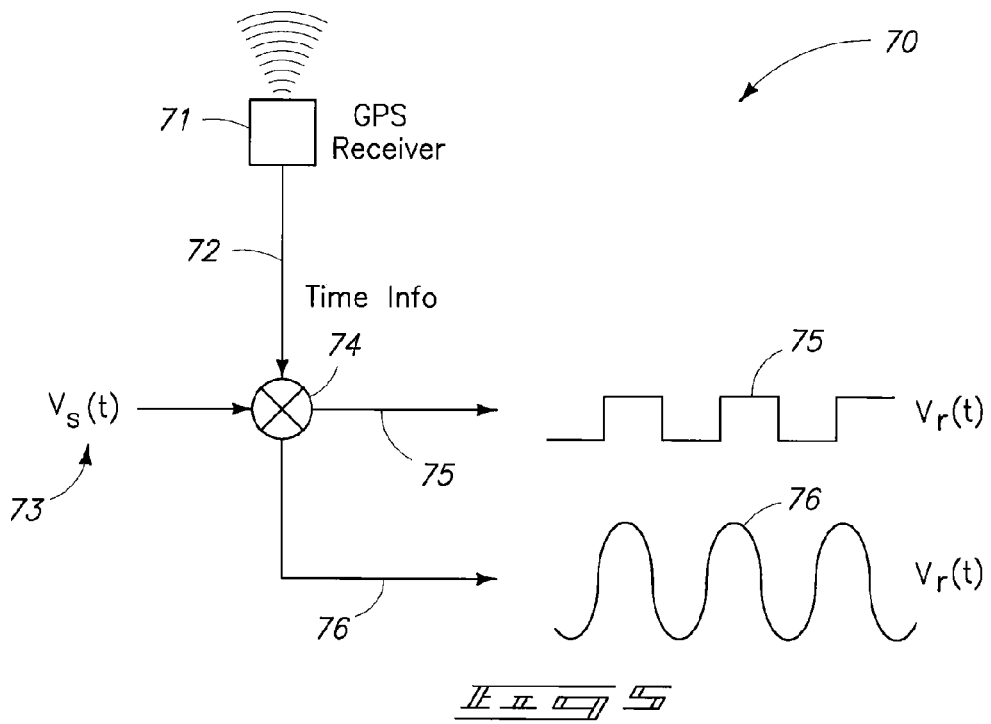
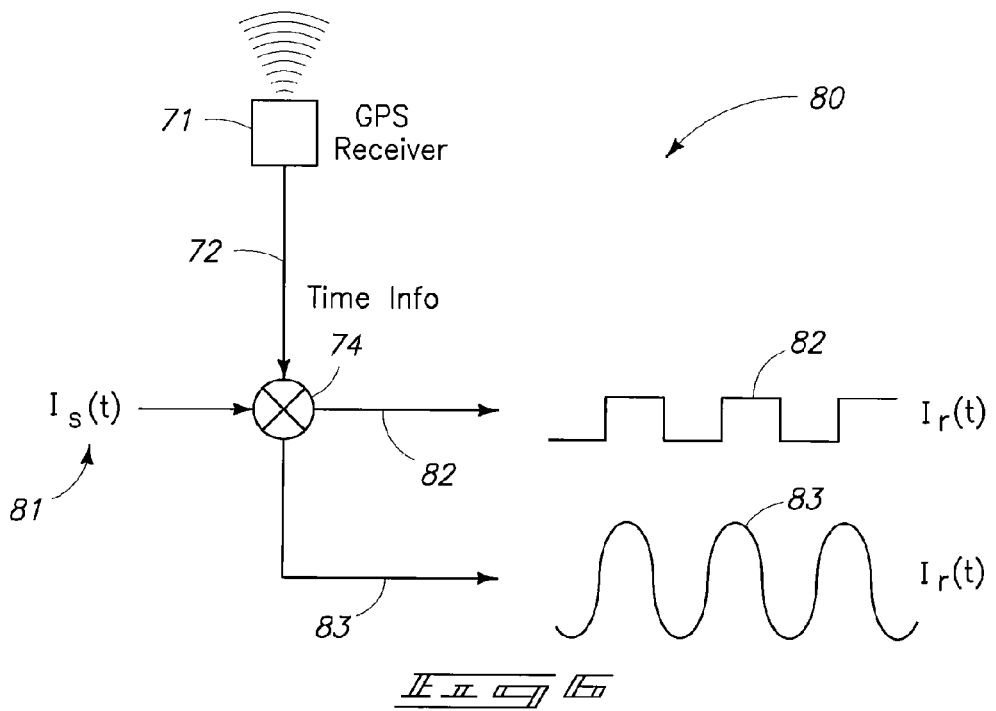

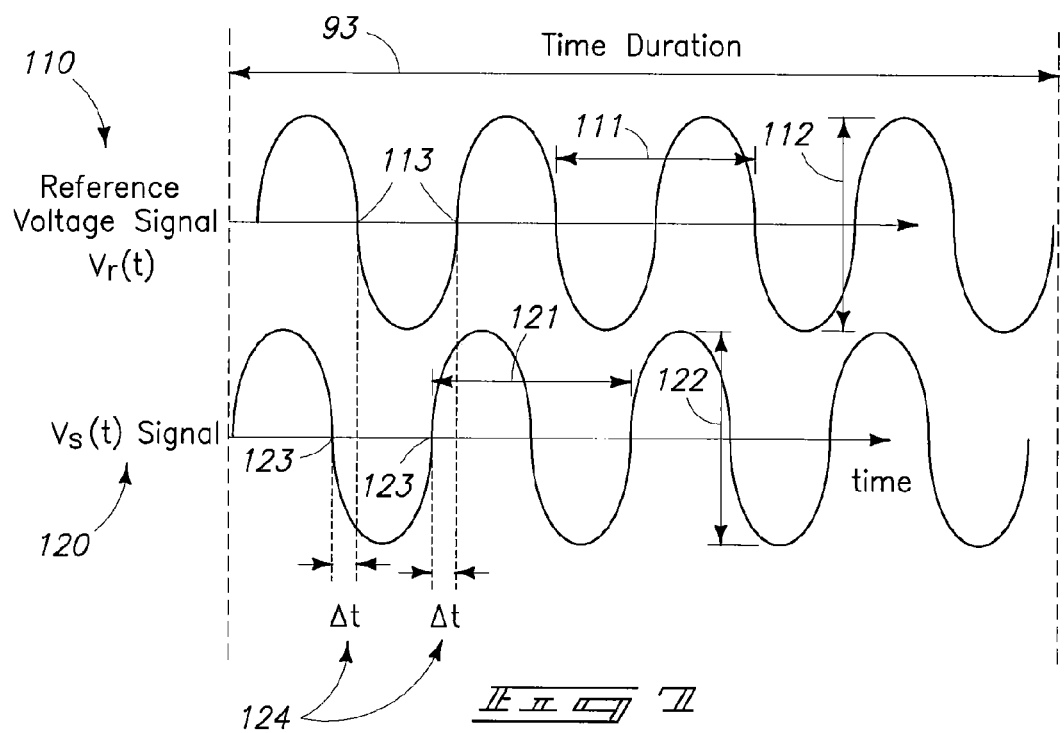
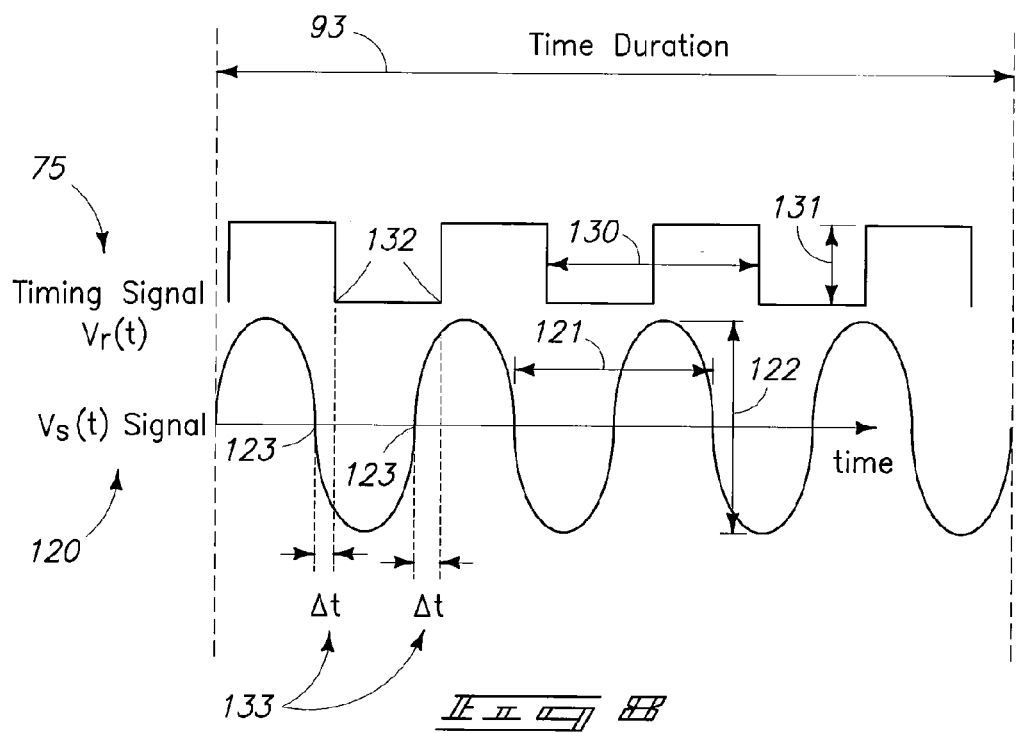

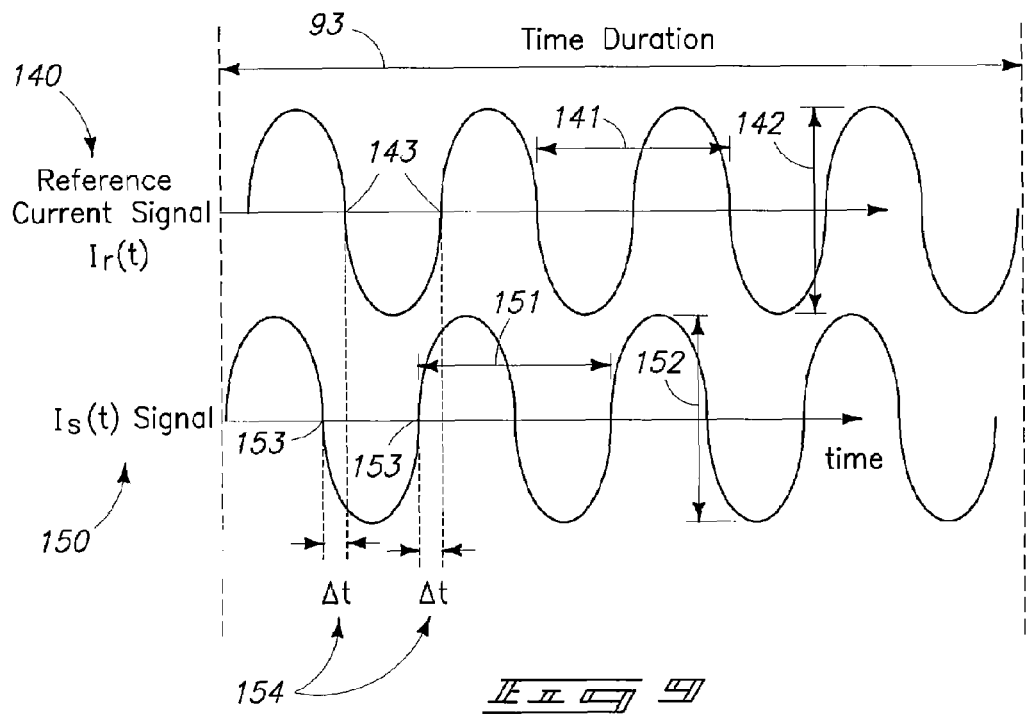
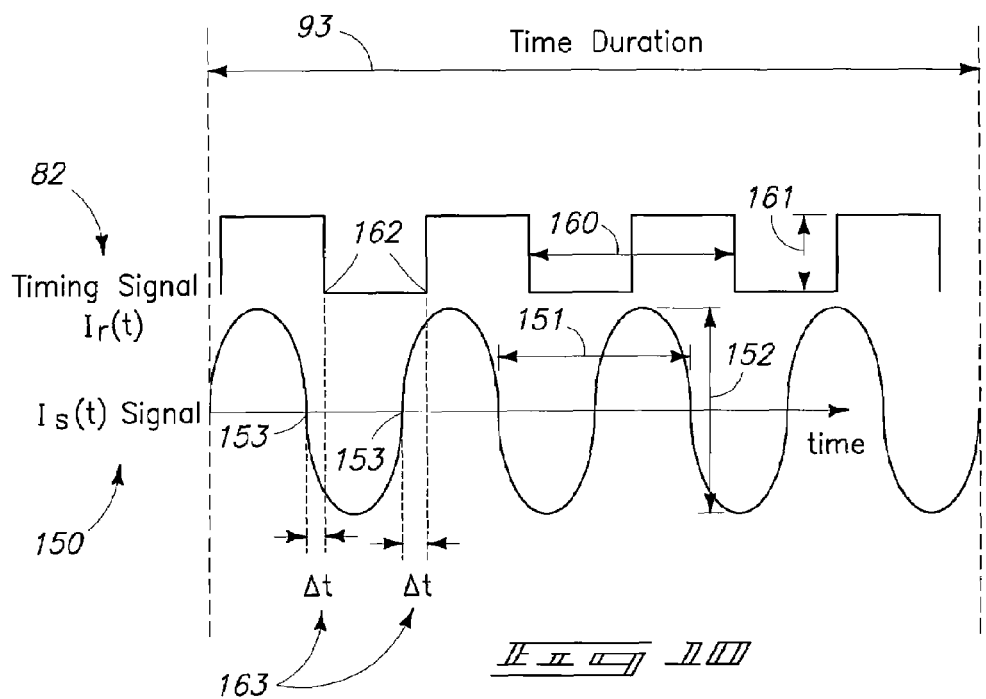

METHOD FOR PROTECTING AN ELECTRIC GENERATOR

GOVERNMENT RIGHTS

The United States Government has certain rights in this invention pursuant to Contract No. DE-AC07-05ID14517 between the United States Department of Energy and Battelle Energy Alliance, LLC.

TECHNICAL FIELD

The present invention relates to a method for protecting an electric generator from an asynchronous condition, and more specifically to a method of protecting an electric generator by comparing the phase angle difference between the measured generator voltage and a reference signal derived from historical system information.

BACKGROUND OF THE INVENTION

Methods of synchronizing alternating current (AC) synchronous electrical power generators to an AC electrical power grid are well known in the art. When an electrical generator is started or re-started, it is initially isolated from the electrical grid. As power is applied to the prime mover, the generator takes time to reach its normal operating speed. With no load or minimal auxiliary load on the generator, the output voltage and frequency of the generator will eventually reach that of the electrical grid to which it will be connected. However, the generator cannot be connected to the grid until the output voltage or current of the generator is at nearly the precise point on its sinusoidal waveform as that of the voltage or current of the electrical grid. When the two waveforms are nearly precisely "in synchronism," or "in phase" with each other, a circuit breaker or circuit switcher that ties the generator to the grid can be closed. The intent of this process is to minimize energy flow across the breaker or switcher as it is closed and to lessen any shock to the generator or other connected rotating machinery. Differences in phase angle between the generator and the grid when a breaker is closed will result in large amount of energy to flow across the contacts of the breaker as it is closing. Thus, this process of synchronization is very delicate. If done improperly, i.e., closing the output breaker when the generator and power system are too far out of voltage phase alignment, it can result in severe and permanent damage to the generator, prime mover, or circuit breaker.

In the typical application of synchronizing a generator to the electrical system during a generator start-up, a synchronizing relay is commonly used to determine when it is permissible to close the circuit breaker or switcher. Modern synchronizing relays are solid-state or microprocessor-based devices which electronically compare the output waveform of the generator to that of the electrical system. These devices are designed only to synchronize an isolated generator from an electrical system by comparing the waveforms on either side of an open circuit breaker. A typical synchronizing relay cannot detect an abnormality on the grid beyond the generator bus, although such abnormalities may cause an asynchronous condition. For example, in many parts of the U.S., generation facilities are located in remote rural areas so as to be closer to the fuel source and further from residential areas. These generators are often tied to the grid with single transmission lines. Typically, if protective relays detect a fault on such a transmission line, a circuit breaker will isolate the line temporarily, but it will automatically reclose after a few seconds (since most transmission line faults are transient in nature). During the time that the circuit breaker is open in this case, the generator is temporarily isolated, or "islanded." The generator may continue operating for those few seconds that the generator is islanded, depending on the load in the area, thus roughly maintaining the system voltage and frequency at the generator bus. However, since the generator is now electrically isolated, it is very likely that the phase angle will shift during this short period of time, relative to the rest of the electric grid. Therefore, if the transmission line circuit breaker recloses without synchronism check supervision, the generator will be closed into the grid in an asynchronous condition, which could potentially cause significant damage to the generator, the prime mover, or the circuit breaker.

Many protection schemes exist to detect and isolate electrical system faults. The challenge for protection engineers is balancing sensitivity with selectivity, i.e., a protection system must be able to detect faults on the devices being protected, but they should not operate for faults beyond their zone of protection (otherwise generation and transmission systems would be tripping repeatedly). Generators are usually equipped with a host of protective relays that will isolate the generator under certain system conditions, including islanding from the grid caused by a remote circuit breaker trip. For example, under/over voltage and under/over frequency relays will eventually detect an islanded condition, since the speed of the generator will change as the generator struggles to match the remaining load. But these relays are relatively insensitive (although very selective), especially if the load in the area surrounding the generator is reasonably matched to the generator output. Therefore, these relays may not respond before the reclose cycle of the transmission line circuit breaker reconnects the generator with the system in an asynchronous condition. A relatively new type of relay, called a vector shift or vector surge relay, has been developed to detect and respond to the generator islanding situation. These relays monitor the sinusoidal waveform of the voltage produced by the generator, and are set to detect a sudden phase shift or rate of change in frequency of the sinusoidal signal, which may indicate a remote asynchronous or islanding condition. The vector shift relay is designed to only compare the relative shift in phase from one cycle to the next. Unfortunately, this sudden phase shift will also occur during many other types of faults on the generator or the grid, so this solution is often considered overly sensitive and not selective enough, thus causing many false generator trips. Another solution to the problem of generator islanding caused by remote circuit breaker trips is to place traditional synchronizing relays at each of the remote circuit breakers which, if tripped and reclosed, could cause an asynchronous condition. In a typical electric grid, however, this could require dozens of synchronism check relay installations, along with required ancillary equipment, which would be cost prohibitive. In addition, the setting and installation of a synchronism check relay could be required in a section of the power grid not owned or controlled by the entity that owns or controls the generator, thus resulting in a potential conflict of interest.

A method for protecting an electrical generator which avoids the shortcomings attendant with the prior art devices and practices utilized heretofore is the subject matter of the present application.

SUMMARY OF THE INVENTION

A first aspect of the present invention relates to a method for protecting an electrical generator, which includes the steps of providing an electrical generator which is electrically coupled to and normally synchronously operated with an electrical power grid; providing a synchronizing signal from the electrical generator; establishing a reference signal; and electrically isolating the electrical generator from the electrical power grid if the synchronizing signal is not in phase with the reference signal.

Another aspect of the present invention relates to a method for protecting an electrical generator, and which includes the steps of providing an electrical generator, which is electrically coupled to and normally synchronously operated with an electrical power grid; providing a synchronizing voltage signal from the electrical generator, and wherein the synchronizing voltage signal is sinusoidal, and which has a frequency $f_s$; establishing historical system information having a time duration, and which relates to the electrical generator and/or the electrical grid; deriving a reference voltage signal from the historical system information, and wherein the reference voltage signal is a periodic time function having a frequency substantially similar to the frequency of the synchronizing voltage signal; determining a phase angle difference between the synchronizing voltage signal and the reference voltage signal; and electrically isolating the electrical generator from the electrical power grid if the magnitude of the phase angle difference is greater than a predetermined value.

Another aspect of the present invention relates to a method for protecting an electrical generator, and which includes the steps of providing an electrical generator, which is electrically coupled to and normally synchronously operated with an electrical power grid; providing a synchronizing signal time function from the electrical generator, and wherein the synchronizing signal time function is sinusoidal, and which has a frequency $f_s$ and an amplitude; deriving a reference signal time function having a time duration of greater than about two cycles, and which is a periodic time function with a frequency substantially similar to $f_s$ and an amplitude, and which is calculated by multiplying the amplitude of a previously calculated reference signal time function over the time duration by $(x-1)/x$, and wherein x is a number that lies within a range of about 4 to about 1000, and multiplying the amplitude of the synchronizing signal time function over the time period p by $1/x$, and summing the synchronizing signal time function multiplied by $1/x$ to the previously calculated reference signal time function multiplied by $(x-1)/x$; determining a phase angle difference between the synchronizing signal time function and the reference signal time function during the time duration; and electrically isolating the electrical generator from the electrical power grid if the magnitude of the phase angle difference is greater than a predetermined value.

Yet another aspect of the present invention relates to a method for protecting an electrical generator, which includes the steps of providing an electrical generator which is electrically coupled to and normally synchronously operated with an electrical power grid; providing a synchronizing signal time function $F_s(t)$ from the electrical generator, and wherein the synchronizing signal time function is sinusoidal, and which has a frequency $f_s$; providing a global positioning system which supplies time information; creating a timing signal based upon the global positioning system time information, and which is in the form of a periodic time function having a frequency which is substantially equal to $f_s$; deriving a reference signal time function from the timing signal over a time duration of about two cycles; determining a phase angle difference between the synchronizing time function signal and the reference time function signal during the time duration; and electrically isolating the electrical generator from the electrical power grid if the magnitude of the phase angle difference is greater than a predetermined value.

Still another aspect of the present invention relates to a method for protecting an electrical generator, which includes the steps of providing an electrical generator which is electrically coupled to and normally synchronously operated with an electrical power grid; providing a synchronizing voltage signal $V_s(t)$ from the electrical generator, and wherein the synchronizing voltage signal is sinusoidal, and which has a frequency $f_s$, and which is derived from a single phase of the electrical generator; calculating a reference voltage signal $V_r(t)$ using the formula:

$$V_r(t)=[V_r(t-1)\cdot(x-1)/x]+[V_r(t)\cdot 1/x],$$

and wherein x is a number that lies within a range of about 4 to about 1000; detecting a zero crossing of the synchronizing voltage signal, and detecting a zero crossing of the reference voltage signal, and measuring a time difference $\Delta t$ between the zero crossing of the synchronizing voltage signal and the zero crossing of the reference voltage signal; calculating a phase angle difference $\Phi$ between the synchronizing voltage signal and the reference voltage signal using the formula:

$$\Phi=360\cdot f_s\cdot \Delta t;$$

comparing the calculated phase angle difference to a predetermined value of about 20 to about 60 degrees; energizing a relay if the calculated phase angle difference is greater than the predetermined value; introducing a time delay of about 1/60 second to about 5 seconds following the determination that the calculated phase angle difference is greater than the predetermined value; and causing the relay to open one or more circuit breakers after the time delay so as to isolate the electrical generator from the electrical power grid.

These and other aspects of the present invention will be described in greater detail hereinafter.

BRIEF DESCRIPTION OF THE DRAWINGS

Preferred embodiments of the invention are described below with reference to the following accompanying drawings.

FIG. 4 is a greatly simplified graphic illustration of the methodology for establishing a reference signal time function based upon historical system information, and which is a feature of the present invention.

FIG. 5 is a greatly simplified schematic diagram of the methodology for generating a reference voltage signal from a GPS receiver, and which is a feature of the present invention.

FIG. 6 is a greatly simplified schematic diagram of the methodology for generating a reference current signal from a GPS receiver, which is a feature of the present invention.

FIG. 8 is a second graphic illustration of a reference voltage signal and the calculation of the phase angle difference, and which forms a feature of the present invention.

FIG. 9 is a first graphic illustration of a reference current signal and the calculation of the phase angle difference, and which forms a feature of the present invention.

FIG. 10 is a second graphic illustration of a reference current signal and the calculation of the phase angle difference, and which forms a feature of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
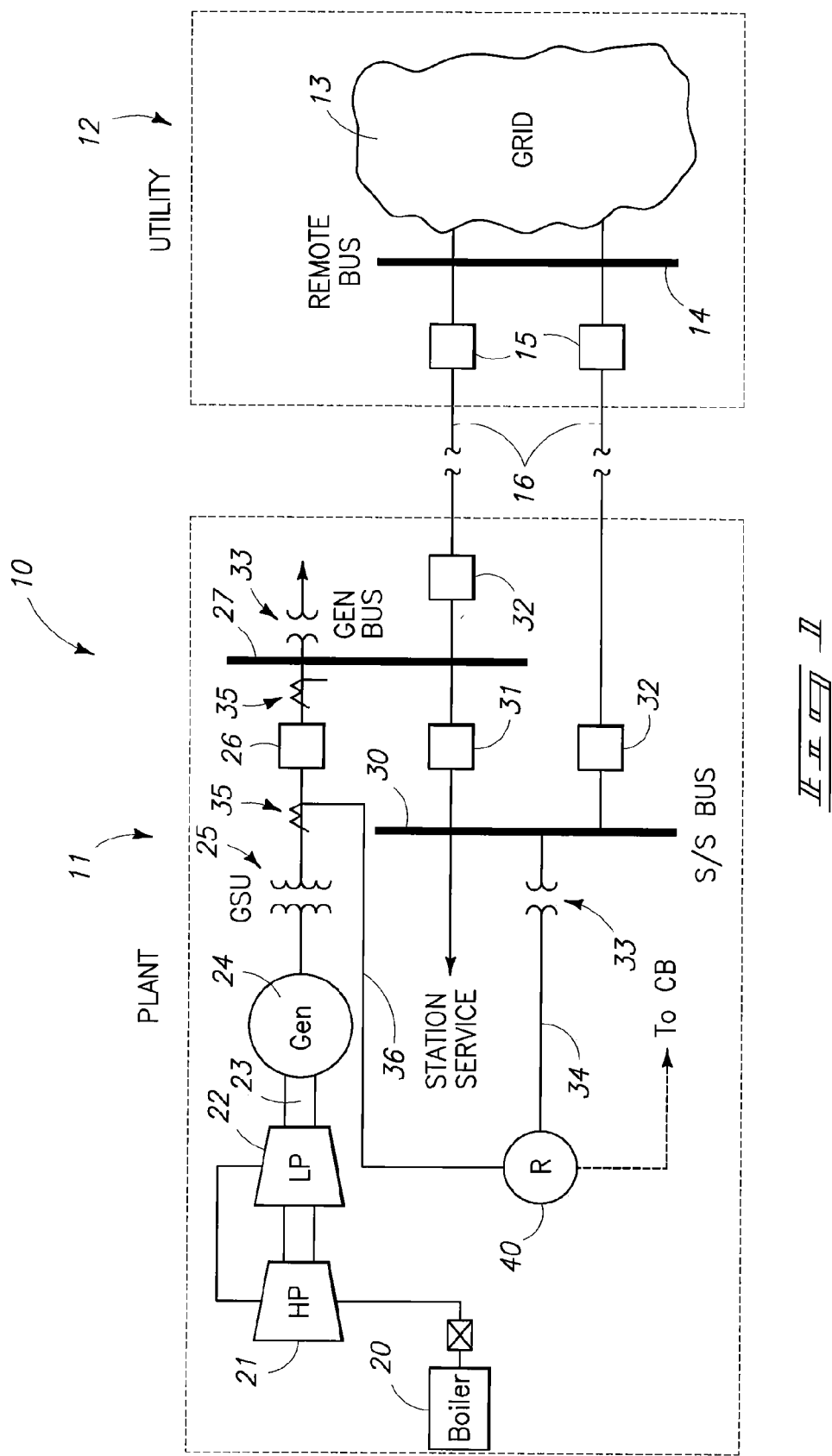
FIG. 1 is a representative schematic diagram of an electrical generator and electrical grid, to which the present invention applies.

Referring now to FIG. 1, an electric power system generally indicated by the numeral 10, to which the present invention applies, is depicted in a representative schematic diagram. The electric power system 10 comprises an electric generating plant 11, described in more detail below, and which is connected to an electric utility 12. The electric utility 12 is connected to, and is part of, an interconnected electric power grid 13. The electric power system in the United States comprises three electric power grids that are non-synchronous relative to each other: the Eastern Interconnect, the Western Interconnect, and the Texas Interconnect. Each of these electric power grids comprise thousands of generators, substations (buses), and transmission lines that interconnect the generators and substations to deliver electric power to loads. In FIG. 1, the electric power grid 13 represents any of these or other interconnected electric power grids. One skilled in the art will recognize that this diagram is in the form of a single line diagram which represents a three-phase power system.

Referring still to FIG. 1, a typical electric generating plant 11 comprises, at least in part, a source of power 20 that drives a prime mover 23. In FIG. 1, a combined cycle, steam driven power plant is depicted, with a boiler 20, which drives a high pressure turbine 21 and a low pressure turbine 22. The turbines 21 and 22 turn a prime mover 23, which is mechanically connected to an electric power generator 24. For the purposes of this invention, the electric generator 24 could be any type of alternating current, synchronous generator, which are well known in the art. Also, it will be recognized that the electric generator 24 could be driven by any type of power source 20, including steam boilers fueled by nuclear fission, coal, oil, natural gas, or solar heating devices. The generator 24 may also be driven by hydropower or wind, or it may even represent a direct current source such as photovoltaic cells or fuel cells if they are used with an inverter. The output voltage of the electric generator 24 is raised or increased to a transmission voltage with a generator step-up (GSU) transformer 25, which is electrically coupled with a generator circuit breaker 26, and with the generator bus 27. The generator bus 27 is also connected to a circuit breaker 31 that serves a station service bus 30, and which supplies auxiliary power to loads within the generator plant 11. The generator bus 27 is also connected to one or more circuit breakers 32 which service one or more transmission lines 16. The transmission lines 16 are connected to a remote bus 14, and which is protected by a remote circuit breaker 15. Thus, the transmission lines 16 electrically couple the electric generator plant 11 to the remote bus 14, the utility 12, and the grid 13. One skilled in the art will recognize that the circuit breakers 15, 26, 31, and 32 may be any one of a number of different types of high voltage circuit breakers or circuit switchers normally used in the electric industry and that are well known in the art. Also, it is recognized that the electrical configuration shown in FIG. 1 for the electric generating plant 11 is only representative, and that many other electrical configurations for a generating plant are known and are possible.

Referring still to FIG. 1, one or more potential transformers 33 are also connected to the generator bus 27, the station service bus 30, or at any other equivalent point within or near the generator plant 11. The potential transformer 33 provides a low voltage representation of the high voltage waveform at the generation plant 11 by stepping down the voltage magnitude to a level that can be used safely by protective relays, sensors, and other generating plant equipment (not shown). Also, one or more current transformers 35 may be provided within the generation plant 11, and which provide a low current representation of the current waveform from the electric generator 24 at a level that is appropriate for protective relays, sensors, and other generating plant equipment (not shown). As shown in FIG. 1, the secondary 34 of the potential transformer 33, and the secondary 36 of the current transformer 35 are connected to a protective device 40, which implements the methodology of the present invention. Potential transformers 33, and current transformers 35 are well known by one of ordinary skill in the art of generator and electric system protection.

Figure 2:
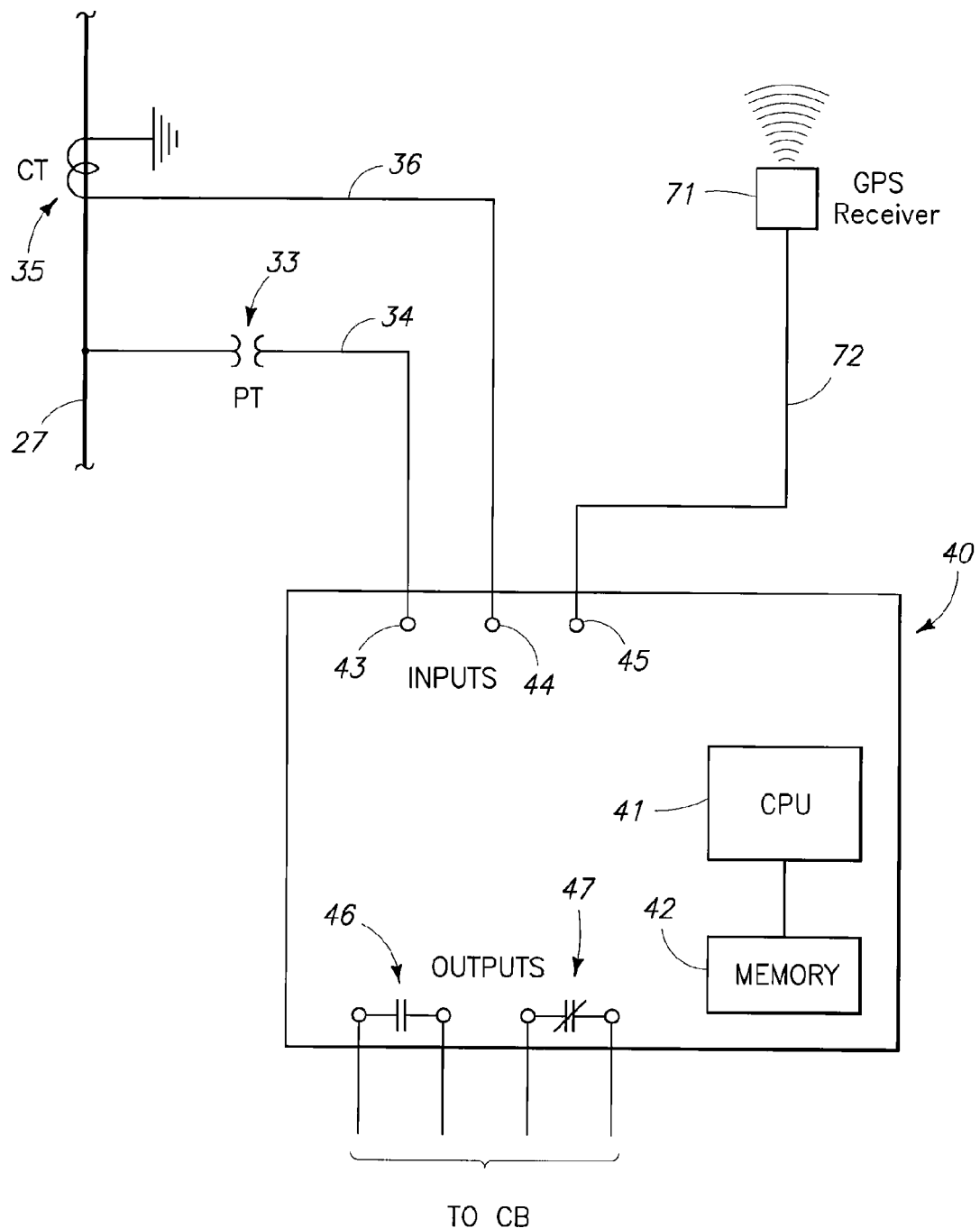
FIG. 2 is a schematic diagram of a portion of a protective device, and which incorporates the method of the present invention.

Referring now to FIG. 2, a schematic representation of a generator protection relay 40 that incorporates features of the present invention is shown. A potential transformer 33, and a current transformer 35, monitor the generator bus 27. The secondary 34 of the potential transformer 33, and the secondary 36, of the current transformer 35 are electrically connected to input terminals 43 and 44, respectively, of the generator protection relay 40. Also providing an input 45 to the protection relay 40 is a GPS receiver 71, which is used in one embodiment of the invention that is discussed in greater detail below. One skilled in the art will recognize that FIG. 2 is a one-line diagram, and that the potential transformer 33, and the current transformer 35, and their respective secondaries 34 and 36 may be one, two, or three phase devices. Other inputs may also be provided. The generator protection relay 40 also includes a central processing unit (CPU) 41 and a memory unit 42. The CPU 41 and memory unit 42 typically are provided as one or more integrated circuits, but they may also be provided as part of an internal or external computer. The outputs of the protection relay 40 are, in the embodiment shown in FIG. 2, a form "a" contact 46 and a form "b" contact 47, which are both individually connected to one or more circuit breakers here indicated by the letters "CB." Upon operation of the protection relay 40, the contacts 46 and 47 change state, thus triggering an operation of the circuit breaker. Additionally, the outputs of the protection relay 40 may take other forms, including a signal from the CPU, or other contact forms, and the outputs may initiate action of other protective devices such as lock-out relays and other system protection control schemes which are well known in the art.

Figure 3:
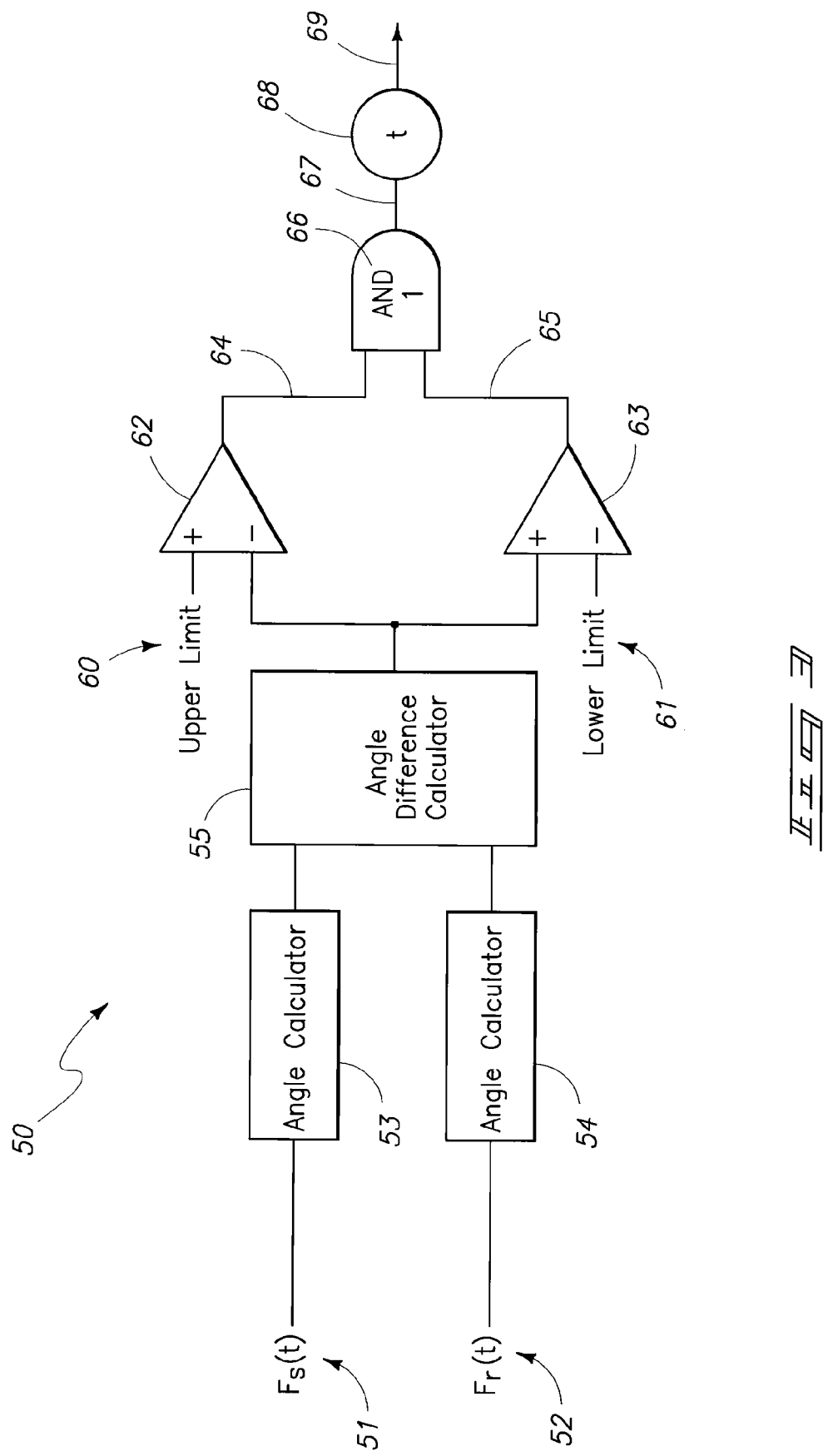
FIG. 3 is a logic diagram which depicts features of the method of the present invention.

Referring now to FIG. 3, one aspect of the present methodology of protecting an electrical generator 24 is seen in the protection logic schema which is indicated by the numeral 50. The logic schema 50 is executed electronically in the CPU 41 of the protection relay 40, as shown in FIG. 2, by a software or firmware program. A first input into the logic schema 50 is a synchronizing signal time function $F_s(t)$ 51, which is a sinusoidal waveform having a frequency $f_s$. The synchronizing signal $F_s(t)$ 51 may represent a voltage waveform $V_s(t)$, as measured from one or more potential transformers 33, or it may represent a current waveform $I_s(t)$, as measured from one or more current transformers 35. In the case of a voltage waveform $V_s(t)$, $F_s(t)$ 51 may normally represent the voltage waveform of the electric generator 24 or the electric grid 13 when they are connected, since the voltage at each point will typically be substantially the same. $F_s(t)$ 51 may also represent a single phase of the three-phase voltage or current, or it could be a composite of all three phases in one of at least two forms (in which case at least three potential transformers 33 or three current transformers 35 will be required). In one form, $F_s(t)$ 51 represents the positive sequence system voltage or current. Expressing three-phase vectors using sequential components is a mathematical method well known to those of ordinary skill in the art of protective relaying. The positive sequence voltage is calculated from a measurement of all three voltage phases using the following mathematical formula:

$$V_{A1} = \tfrac{1}{3} \cdot (V_A + aV_B + a^2 V_C) = V_s(t),$$

where a is the unity phasor $1\angle 120°$. Likewise, the positive sequence current is calculated from a measurement of all three current phases using the following mathematical formula:

$$I_{A1} = \tfrac{1}{3} \cdot (I_A + aI_B + a^2 I_C) = I_s(t),$$

In another form, $F_s(t)$ 51 represents an alpha voltage or current, which is calculated from a measurement of all three phases using the following mathematical formula:

$$V_\alpha = \tfrac{2}{3} \cdot [V_A - (V_B + V_C)/2] = V_s(t),$$

or $$I_\alpha = \tfrac{2}{3} \cdot [I_A - (I_B + I_C)/2] = I_s(t).$$

Referring still to FIG. 3, another input to the logic schema 50 is a reference signal time function $F_r(t)$ 52. The reference signal $F_r(t)$ 52 may represent a reference voltage waveform $V_r(t)$, or it may represent a reference current waveform $I_r(t)$. One salient feature of the present invention is that the reference time function 52 is based upon historical system information, i.e., the voltage or current waveform that existed during a time duration before the event that triggered an asynchronous condition that the methodology is intended to detect. The time duration of the historical system information is greater than about two cycles, although it typically may range from about two cycles to about 120 cycles, which corresponds to about 1/30 second to about two seconds in a 60 Hz power system.

Figure 7:
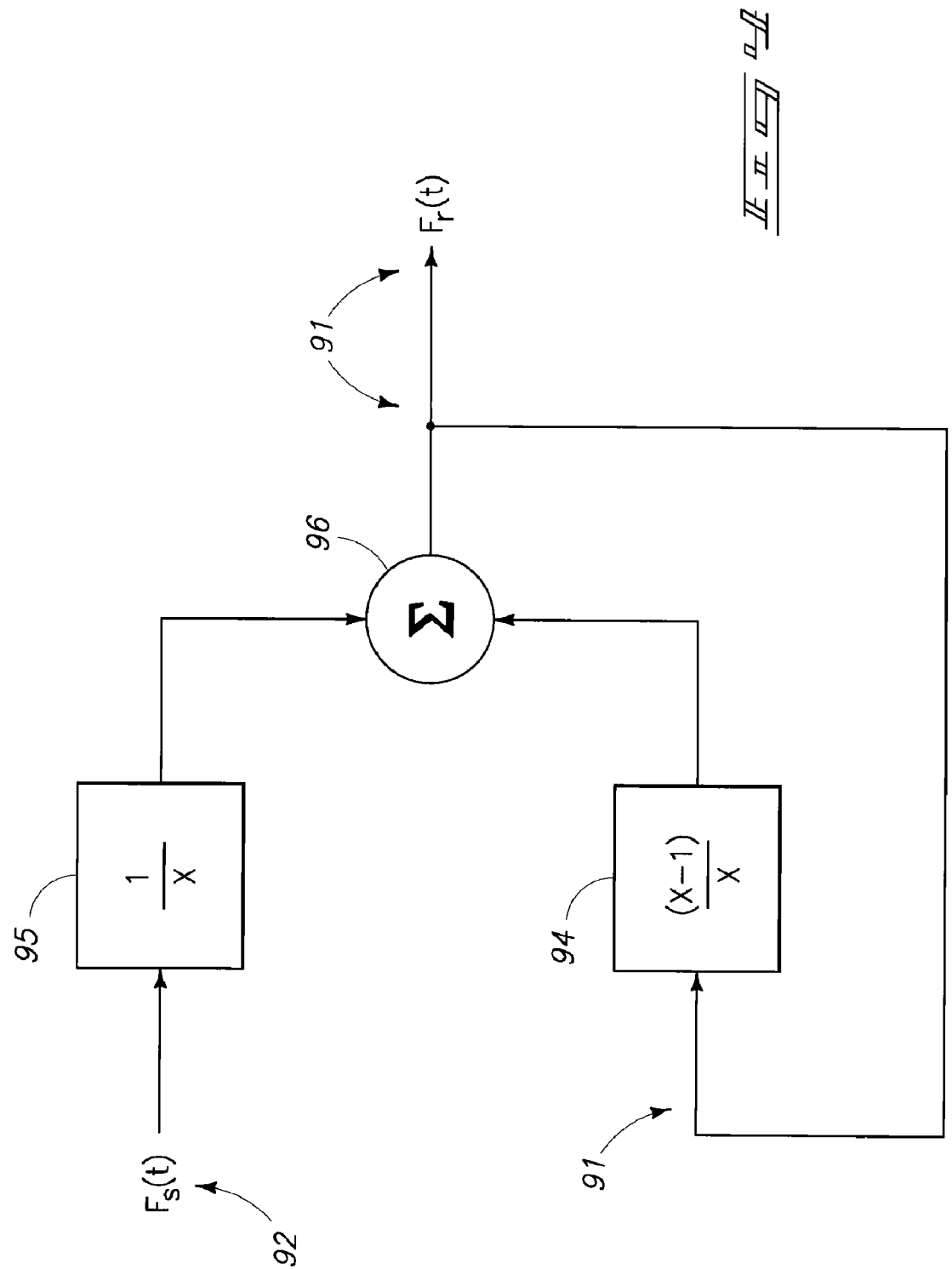
FIG. 7 is a first graphic illustration showing a reference voltage signal and the calculation of the phase angle difference, and which forms a feature of the present invention.

Referring now to FIG. 4, a form of the invention is illustrated, in which the reference signal $F_r(t)$ 52 is derived from the historical values of the synchronizing signal $F_s(t)$ 51. Historical system information (shown as $F_r(t)$ and designated by the numeral 91 in FIG. 4) is stored in the electronic memory 42 of the generator protection relay 40, as shown in FIG. 2. The historical system information 91 can take the form of either a historical voltage waveform, or a historical current waveform, and has a time duration 93 (FIGS. 7 and 8). To insure that the historical information 91 is current, a mathematical scheme is used to periodically update the historical information 91 with new system information from the input synchronizing signal, as discussed above, and which is shown as $F_s(t)$ in FIG. 4, and indicated by the numeral 92. The most recent historical system information 91 is shown as a time function waveform which has an amplitude. The amplitude of the historical system information time function 91 is multiplied in a multiplier 94 over the time duration 93 by $(x-1)/x$, and where x is a number that lies within a range of about 4 to about 1000. The amplitude of the synchronizing signal 92 is multiplied in a multiplier 95 over the time period 93 by $1/x$. The synchronizing signal 92 which is multiplied by $1/x$, is summed in summer 96 to the historical system information 91 multiplied by $(x-1)/x$. The result of the summing in summer 96 is now provided as the new historical system information 91. This is now the new reference signal time function $F_r(t)$. This process is continually repeated for every time interval equal to the time duration 93. It should be recognized that the value chosen for the number x will determine how much impact the synchronizing signal 92 will have on the reference signal 91. For example, the greater the value for x, the less the impact of the new information will have on the historical information. This is desirable so that sudden changes in system voltage or current will not appreciably influence or "contaminate" the reference signal. However, the number chosen for x should be small enough so that the reference signal will change over time due to slight changes in the system voltage or current waveforms not caused by system faults, such as slight changes in frequency. A typical number chosen for x is 128. One skilled in the art will also recognize that this process of creating a reference signal $F_r(t)$ from a synchronizing signal $F_s(t)$, as seen in FIG. 4, can also be expressed mathematically with the following formula:

$$F_r(t) = [F_r(t-1) \cdot (x-1)/x] + [F_s(t) \cdot 1/x]$$

where x now is a number that lies within a range of about 4 to 1000. Referring back again to FIG. 3, the result of the methodology as illustrated in FIG. 4 is that a reference signal time function $F_r(t)$ 52 is now provided to the logic schema 50 that is based on the historical system information derived over time by periodic inputs of the synchronizing signal time function $F_s(t)$ 51 as previously discussed above.

Referring now to FIGS. 5 and 6, a second aspect of the present invention relates to a methodology of deriving the reference signal 52 using a time signal generator, which is generally indicated by the numerals 70 and 80, respectively. In one form, a reference voltage signal labeled $V_r(t)$ is derived using a time signal generator 70, as shown in FIG. 5. The widely used and recognized global positioning system (GPS) system (not shown) includes extremely accurate time information for time-stamping operations. The time signal generator 74 includes a GPS receiver 71 that receives the GPS signal. The time information 72 from the GPS receiver 71 is combined mathematically with a synchronizing voltage signal $V_s(t)$ input 73 using a time signal generator 74. The time signal generator 74 will use the frequency of $V_s(t)$ input 73 to generate a time signal waveform 75 or 76 in the form of a periodic time function with a frequency substantially similar to that of $V_s(t)$ 73. The time signal waveform may be in the form of a square wave output 75 or a sinusoidal waveform output 76. Other periodic time functions may also be used. In another form of the invention, as seen in FIG. 6, a reference current signal which is labeled $I_r(t)$ is derived using a time signal generator 80. The time signal generator 80 includes a GPS receiver 71 that receives the GPS signal. The time information 72 from the GPS receiver 71 is combined mathematically with a synchronizing current signal $I_s(t)$ input 81 using a time signal generator 74. The time signal generator 74 will use the frequency of $I_s(t)$ 81 to generate a time signal waveform 82 or 83 in the form of a periodic time function with a frequency substantially similar to that of $I_s(t)$ 81. The time signal waveform may be in the form of a square wave output 82, or a sinusoidal waveform output 83. Other periodic time functions may also be used. Because of the extreme time accuracy of the GPS time information 72, even if the frequency or waveform of $V_s(t)$ 73 or $I_s(t)$ 81 is substantially modified during an asynchronous condition, the time signal waveform 75, 76, 82 or 83 will continue to provide a solid reference voltage or current signal input 52 for the logic schema 50 as shown in FIG. 3. One skilled in the art will recognize that one of the salient features of the present invention is that the reference signal 52 is based on historical system information, i.e., the voltage waveform that existed immediately before the event that triggered the asynchronous condition. As will be recognized, the reference signal 52 covers a time duration greater than about two cycles. Typically, the time duration of the historical information ranges from about two cycles to about 120 cycles, which corresponds to about 1/30 second to about 2 seconds in a 60 Hz power system.

Referring again now to FIG. 3, the logic schema 50 compares the stored reference signal time function $F_r(t)$ 52 to an incoming synchronizing signal time function $F_s(t)$ 51 in order to detect a remote asynchronous condition, using the process which is now described in detail. The logic schema 50 includes a phase angle calculator 53 for $F_s(t)$ 51; and a phase angle calculator 54 for $F_r(t)$ 52. These phase angles are used by a phase angle difference calculator 55 to detect, and calculate, any phase differences between $F_s(t)$ 51 and $F_r(t)$ 52, which would indicate a remote asynchronous condition. Again, $F_s(t)$ 51 and $F_r(t)$ 52 may be either voltage or current waveforms.

Referring now to FIG. 7, methodology of calculating the phase angle difference $\Phi$ of a voltage waveform using one form of the invention is shown. In FIG. 7, the reference signal $V_r(t)$ 110 corresponds to $F_r(t)$ 52 in FIG. 3, and it is derived from the mathematical process shown in FIG. 4, as was discussed previously, above. The reference signal $V_r(t)$ waveform 110 has a wavelength 111, which corresponds to a frequency $f_r$, and a peak amplitude 112. The sinusoidal waveform of $V_r(t)$ has, by nature, a periodic zero crossing indicated in FIG. 7 by the numeral 113. The synchronizing signal $V_s(t)$ 120 shown in FIG. 7, which corresponds to $F_s(t)$ 51 in FIG. 3, is shown with a phase shift that may be caused by a remote asynchronous condition that the present invention is intended to detect. The phase shifted $V_s(t)$ waveform 120 has a wavelength 121, which corresponds to a frequency $f_s$, and a peak amplitude 122. One skilled in the art will note that while $f_s$ may differ from $f_r$, that difference may or may not be significant or detectable, depending upon the nature of the remote asynchronous condition. The phase shifted $V_s(t)$ waveform 120 also has a sinusoidal shape that has a periodic zero crossing 123. In the phase angle difference calculator 55 as shown in the logic schema 50 as illustrated in FIG. 3, the time difference $\Delta t$ 124 is calculated by determining the difference in time between the zero crossing 113 of the reference signal $V_r(t)$ 110, and the zero crossing 123 of the phase shifted synchronizing signal $V_s(t)$ 120. The phase angle difference $\Phi$ is then calculated using the formula:

$$\Phi = 360 \cdot f_s \cdot \Delta t$$

This phase angle difference calculation is performed over the time duration 93 of the reference signal, which is shown as four cycles in FIG. 7. Of course, the time duration 93 can be any time duration over about two cycles. Thus, one skilled in the art will recognize the increased accuracy of the method for detecting a remote asynchronous condition of the present invention over the prior art in that the comparison of the sudden phase angle shift is based on historical system information that is not appreciably influenced by sudden phase shifts.

Referring now to FIG. 9, the method of calculating the phase angle difference $\Phi$ of a current waveform using one form of the invention is shown. In this embodiment, the reference signal $I_r(t)$ 140 in FIG. 9 corresponds to $F_r(t)$ 52 in FIG. 3. It is derived from the mathematical process as shown in FIG. 4, and which was previously discussed, above. The reference signal $I_r(t)$ waveform 140 has a wavelength 141, which corresponds to a frequency $f_r$, and a peak amplitude 142. The sinusoidal waveform of $I_r(t)$ has, by nature, a periodic zero crossing indicated in FIG. 9 by the numeral 143. The synchronizing signal $I_s(t)$ 150 as shown in FIG. 9, and which corresponds to $F_s(t)$ 51 in FIG. 3, is shown with a phase shift that may be caused by a remote asynchronous condition that the present invention is intended to detect. The phase shifted $I_s(t)$ waveform 150 has a wavelength 151, which corresponds to a frequency $f_s$, and a peak amplitude 152. The phase shifted $I_s(t)$ waveform 150 also has a sinusoidal shape that has a periodic zero crossing 153. In the phase angle difference calculator 55 as shown in the logic schema 50 as depicted in FIG. 3, the time difference $\Delta t$ 154 (FIG. 9) is calculated by determining the difference in time between the zero crossing 143 of the reference signal $I_r(t)$ 140 and the zero crossing 153 of phase shifted synchronizing signal $I_s(t)$ 150. The phase angle difference $\Phi$ is then calculated using the formula:

$$\Phi = 360 \cdot f_s \cdot \Delta t$$

This phase angle difference calculation is performed over the time duration 93 of the reference signal, which is shown as four cycles in FIG. 9.

Referring now to FIGS. 8 and 10, the method of calculating the phase angle difference $\Phi$ using the one form of the invention is shown. In this form $F_r(t)$ 52 is derived from a GPS-generated time signal, which is a periodic time function as shown in the form of a square wave 75 and 82 (as illustrated in FIGS. 5 and 6, respectively). Again, $F_s(t)$ 51 and $F_r(t)$ 52 may be either voltage or current waveforms. In the case of voltage waveforms, as shown in FIG. 8, the square wave reference signal $V_r(t)$ 75 has a wavelength 130, which corresponds to a frequency $f_r$, and a peak amplitude 131. The reference signal $V_r(t)$ 75 has a periodic zero crossing indicated in FIG. 8 by the numeral 132. The synchronizing signal $V_s(t)$ 120 is also shown in FIG. 8, but is shown with a phase shift that may be caused by a remote asynchronous condition that the present invention is intended to detect. The phase shifted $V_s(t)$ waveform 120 has a wavelength 121, which corresponds to a frequency $f_s$, and a peak amplitude 122. The phase shifted $V_s(t)$ waveform also has a sinusoidal shape that has a periodic zero crossing 123. In the phase angle difference calculator 55 shown in the logic schema 40 shown in FIG. 2, the time difference $\Delta t$ 133 is calculated by determining the difference in time between the zero crossing 132 of the reference signal $V_r(t)$ and the zero crossing 123 of phase shifted synchronizing signal $V_s(t)$. The phase angle difference $\Phi$ is then calculated using the formula:

$$\Phi = 360 \cdot f_s \cdot \Delta t.$$

This phase angle difference calculation is performed over the time duration 93 of the reference signal, which is shown as four cycles in FIG. 8.

Referring now to FIG. 10, the phase angle difference calculation using one form of the invention is show for the case of current waveforms. The square wave reference signal $I_r(t)$ 82 has a wavelength 160, which corresponds to a frequency $f_r$, and a peak amplitude 161. The reference signal $I_r(t)$ 82 has a periodic zero crossing indicated in FIG. 10 by the numeral 162. The synchronizing signal $I_s(t)$ 150 is also shown in FIG. 10, but is shown with a phase shift that may be caused by a remote asynchronous condition that the present invention is intended to detect. The phase shifted $I_s(t)$ waveform 150 has a wavelength 151, which corresponds to a frequency $f_s$, and a peak amplitude 152. The phase shifted $I_s(t)$ waveform also has a sinusoidal shape that has a periodic zero crossing 153. In the phase angle difference calculator 55 shown in the logic schema 50 shown in FIG. 3, the time difference Δt 163 is calculated by determining the difference in time between the zero crossing 162 of the reference signal $I_r(t)$ and the zero crossing 153 of phase shifted synchronizing signal $I_s(t)$. The phase angle difference Φ is then calculated using the formula:

$$\Phi = 360 \cdot f_s \cdot \Delta t.$$

This phase angle difference calculation is performed over the time duration 93 of the reference signal, which is shown as four cycles in FIG. 10.

Referring again now to FIG. 3, the phase angle difference Φ, once calculated, is next compared to an acceptable operating range. The phase angle difference Φ is provided as an input to an upper limit comparator 62 and a lower limit comparator 63. A predetermined upper limit input 60, is also provided to the upper limit comparator 62, and a predetermined lower limit input 61 is also provided to the lower limit comparator 63. If the calculated phase angle difference Φ is greater than the upper limit input 60, the upper limit comparator 62 will have an output 64 set to a logical 0 value. If the calculated phase angle difference Φ is less than the upper limit input 60, the upper limit comparator 62 will have an output 64 set to a logical 1 value. Likewise, if the calculated phase angle difference Φ is greater than the lower limit input 61, the lower limit comparator 63 will have an output 64 set to a logical 1 value. And if the calculated phase angle difference Φ is less than the lower limit input 61, the lower limit comparator 63 will have an output 64 set to a logical 0 value. The upper limit comparator output 64 and the lower limit comparator output 65 are inputs to an AND gate 66. If both inputs to the AND gate 66 are logical 1's, the AND gate output 67 will return a logical 1. If only the lower limit comparator output 65 is a logical 1, the AND gate output 67 will return a logical 0. The upper limit input 60 is normally set to a value that is predetermined to indicate that a serious asynchronous event has occurred that has resulted in a large and relatively sudden phase shift. Therefore, if the AND gate output 67 is a logical 1, the generator circuit breaker 26 (as shown in FIG. 1) will be substantially immediately opened so as to isolate the generator 24 from the serious asynchronous event as soon as possible. The lower limit input 61 is normally set to a value that is predetermined to indicate that no asynchronous event has occurred and any phase difference measured does not require an immediate response or actions. In the case where AND gate 67 has a logic 1 output, a time delay is desired to allow for transient faults that have not caused a generator islanding condition to clear. Therefore, if the AND gate output 67 is a logic 1, a time delay relay 68 is energized. If the asynchronous condition has cleared within the predetermined time delay, no action is taken. If the asynchronous condition persists, the time delay relay 68 times out, and the generator circuit breaker 26 is tripped (opened) so as to isolate the generator 24 from the asynchronous event. A typical time delay is between 1/60 of a second (one cycle in a 60 Hz system) to about 5 seconds (300 cycles in a 60 Hz system), which is normally less than the time a remote circuit breaker 15 will automatically reclose and which may cause damage to various electric power system devices that the present invention intends to prevent. A typical value for the upper limit input 60 is about 60 to 70 degrees, which would indicate a serious asynchronous event, and a typical value for the lower input limit 61 is about 10 to 20 degrees.

Operation

The operation of the described embodiment of the present invention is believed to be readily apparent and is briefly summarized at this point.

The method of the invention includes as a first step, providing an electrical generator 24 which is electrically coupled to and normally synchronously operated with an electrical power grid 13. Still further, the method includes the step of providing a synchronizing signal 51 and establishing a reference signal 52. The method further includes a step of electrically isolating the electrical generator from the electrical power grid 13 if the synchronizing signal 51 is not in phase with the reference signal 52.

In another aspect of the invention, the method includes a step of providing an electrical generator 24 which is electrically coupled to and normally synchronously operated with an electrical power grid 13. Further, the method includes another step of providing a synchronizing voltage signal 120 from the electrical generator, which is sinusoidal, and which has a frequency based upon a wavelength 121. The method includes another step of establishing historical system information 110, which relates to the electrical generator 24 and/or the electrical grid 13, over a time duration 93. Additionally, the method includes a step of deriving a reference voltage signal 110 from the historical system information, and wherein this reference voltage signal 110 is a periodic time function with a wavelength 111 and a corresponding frequency which is substantially similar to the frequency of the synchronizing voltage signal 120. The method includes another step of determining a phase angle difference Φ between the synchronizing voltage signal 120 and the reference voltage signal 110; and electrically isolating the electrical generator 24, if the magnitude of the phase angle difference Φ is greater than a predetermined value, from the electrical power grid 13.

In still another aspect of the invention, the method for protecting an electrical generator includes a first step of providing an electrical generator 24 which is electrically coupled to and normally synchronously operated with an electrical power grid 13. The method includes a second step of providing a synchronizing signal time function 51, which is sinusoidal and has a frequency $f_s$. Still further, the method includes a third step of deriving a reference signal time function 52, having a time duration 93 of greater than about two cycles, and which is a periodic time function with a frequency substantially similar to $f_s$. The reference signal time function 52 is calculated by multiplying the amplitude 105 of a previously calculated reference signal time function 91 over the time duration 93 by (x−1)/x, and then multiplying the amplitude 106 of the synchronizing signal time function 92 over the time period 93 by 1/x, and then summing the synchronizing signal time function multiplied by 1/x to the previously calculated reference time function multiplied by (x−1)/x. The number x lies within a range of about 10 to about 1000. The method includes a further step of determining a phase angle difference Φ between the synchronizing signal time function 51, and the reference signal time function 52, during the time duration 93. The method includes a fifth step of electrically isolating the electrical generator 24 from the electrical power grid 13 if the magnitude of the phase angle difference Φ is greater than a predetermined value 62, 63.

In yet still another aspect of the present invention, the methodology includes a step of providing an electrical generator 24 which is electrically coupled to, and normally synchronously operated with, an electrical power grid 13. The method includes another step of providing a synchronizing signal time function 51, from the electrical generator and which is sinusoidal and has a frequency $f_s$. The methodology includes another step of deriving a reference signal time function 52, having a time duration 93 of greater than about two cycles, and which is a periodic time function with a frequency substantially similar to $f_s$. The reference signal time function 52 is derived from a global positioning system receiver 71 which supplies time information 72. The method includes another step of creating a timing signal 75, 82 based upon the global positioning system time information 72 and which becomes the reference signal time function 52. The method includes a step of determining a phase angle difference $\Phi$ between the synchronizing signal time function 51 and the reference signal time function 52 during the time duration 93. The method includes a step of electrically isolating the electrical generator 24 from the electrical power grid 13 if the magnitude of the phase angle difference $\Phi$ is greater than a predetermined value 62, 63.

In another aspect of the invention, the method includes a step of providing an electrical generator 24 which is electrically coupled to and normally synchronously operated with an electrical power grid 13; and providing a synchronizing signal time function 120 from the electrical generator, which is derived from a single phase of the electrical generator 24, and which is sinusoidal and has a frequency $f_s$. The method includes another step of calculating a reference voltage signal $V_r(t)$ 110 using the formula:

$$V_r(t)=[V_r(t-1)\cdot(x-1)/x]+[V_s(t)\cdot 1/x],$$

and wherein x is a number that lies within a range of about 4 to about 1000. The method includes another step of detecting the zero crossing 123 of the synchronizing voltage signal 120, and the zero crossing 113 of the reference voltage signal 110. A time difference $\Delta t$ 124 is measured between the zero crossing 123 of the synchronizing voltage signal 120 and the zero crossing 113 of the reference voltage signal 110. The method includes another step of calculating a phase angle difference $\Phi$ between the synchronizing voltage signal 120 and the reference voltage signal 110 by using the formula:

$$\Phi=360\cdot f_s\cdot\Delta t;$$

The method includes another step of comparing calculated phase angle difference $\Phi$ to a predetermined value 62, 63 of about 20 to about 60 degrees. The method includes yet another step of energizing a relay 68 if the calculated phase angle difference $\Phi$ is greater than the predetermined value. The method includes another step of introducing a time delay of about 1/60 second to about 5 seconds following the determination that the calculated phase angle difference $\Phi$ is greater than the predetermined value 62, 63; and causing the relay 40 to open more circuit breakers 26, 31 after the time delay so as to isolate the electrical generator 24 from the electrical power grid 13.

Therefore, it will be seen that the present methodology provides many advantages over the present prior art practices while simultaneously avoiding the shortcomings attached to the previous devices and methodology employed heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for protecting an electrical generator, comprising:
   providing an electrical generator which is electrically coupled to and normally synchronously operated with an electrical power grid;
   providing a synchronizing signal from the electrical generator;
   deriving a periodic time function reference signal from historical system information having a time duration, and relating to the electrical generator and/or the electrical power grid; and
   electrically isolating the electrical generator from the electrical power grid if the synchronizing signal is not in phase with the reference signal.

2. A method for protecting an electrical generator as claimed in claim 1, and wherein the step of providing a synchronizing signal includes providing a synchronizing voltage signal, and wherein the step of establishing a reference signal includes establishing a reference voltage signal.

3. A method for protecting an electrical generator as claimed in claim 1, and wherein the step of providing a synchronizing signal includes providing a synchronizing current signal, and wherein the step of establishing a reference signal includes establishing a reference current signal.

4. A method for protecting an electrical generator as claimed in claim 1, and wherein the time duration is greater than about two cycles.

5. A method for protecting an electrical generator as claimed in claim 1, and wherein the time duration is about two cycles to about 120 cycles.

6. A method for protecting an electrical generator as claimed in claim 1, and wherein the time duration is about six cycles to about 60 cycles.

7. A method for protecting an electrical generator as claimed in claim 1, and wherein the synchronizing signal is a time function with an amplitude and a frequency, and wherein the historical information is a time function with an amplitude and a frequency, and wherein the step of deriving a reference signal time function from the historical system information time function further comprises:
   multiplying the amplitude of the historical system information time function over the time duration by $(x-1)/x$, and wherein x is a number that lies within a range of about 4 to about 1000;
   multiplying the amplitude of the synchronizing signal time function over the time period by $1/x$;
   summing the synchronizing signal time function multiplied by $1/x$ to the historical system information time function multiplied by $(x-1)/x$;
   setting the summed time function to be equal to the historical system information time function.

8. A method for protecting an electrical generator as claimed in claim 1, and wherein the step of providing a synchronizing signal comprises providing a synchronizing signal time function, and wherein the step of deriving a reference signal time function from the historical system information further comprises:
   providing a global positioning system which supplies time information; and
   creating a timing signal based upon the global positioning system time information, and which is in the form of a periodic time function having a frequency which is substantially equal to the frequency of the synchronizing signal time function.

9. A method for protecting an electrical generator, comprising:
- providing an electrical generator, which is electrically coupled to and normally synchronously operated with an electrical power grid;
- providing a synchronizing voltage signal from the electrical generator, and wherein the synchronizing voltage signal is sinusoidal, and which has a frequency $f_s$;
- establishing historical system information having a time duration, and which relates to the electrical generator and/or the electrical grid;
- deriving a reference voltage signal from the historical system information, and wherein the reference voltage signal is a periodic time function having a frequency substantially similar to the frequency of the synchronizing voltage signal;
- determining a phase angle difference between the synchronizing voltage signal and the reference voltage signal; and
- electrically isolating the electrical generator from the electrical power grid if the magnitude of the phase angle difference is greater than a predetermined value.

10. A method for protecting an electrical generator as claimed in claim 9, and wherein the time duration is greater than about two cycles.

11. A method for protecting an electrical generator as claimed in claim 9, and wherein the time duration is about two cycles to about 120 cycles.

12. A method for protecting an electrical generator as claimed in claim 9, and wherein the time duration is about six cycles to about 60 cycles.

13. A method for protecting an electrical generator as claimed in claim 9, and wherein the step of deriving a reference voltage signal from the historical system information comprises:
- multiplying the amplitude of the historical system information over the time duration by (x−1)/x, and wherein x is a number that lies within a range of about 4 to about 1000;
- multiplying the amplitude of the synchronizing signal time function over the time period p by 1/x;
- summing the synchronizing signal time function multiplied by 1/x to the historical system information time function multiplied by (x−1)/x;
- setting the summed time function to be equal to the historical system information time function.

14. A method for protecting an electrical generator as claimed in claim 9, and wherein the step of deriving a reference voltage signal from the historical system information comprises:
- providing a global positioning system which supplies time information;
- creating a timing signal based upon the global positioning system time information, and which is in the form of a periodic time function having a frequency which is substantially equal to the frequency of the synchronizing voltage.

15. A method for protecting an electrical generator as claimed in claim 9, and wherein step of determining the phase angle difference Φ further comprises:
- detecting a zero crossing of the synchronizing voltage signal;
- detecting a zero crossing of the reference voltage signal;
- measuring a time difference Δt between the zero crossing of the synchronizing voltage signal and the zero crossing of the reference voltage signal; and
- calculating a phase angle difference Φ between the synchronizing voltage signal and the reference voltage signal using the formula:

$$\Phi = 360 \cdot f_s \cdot \Delta t.$$

16. A method for protecting an electrical generator as claimed in claim 9, and wherein the predetermined value is about 20 to about 60 degrees.

17. A method for protecting an electrical generator as claimed in claim 9, and wherein the step of electrically isolating the generator from the electrical power grid further comprises:
- energizing a relay if the magnitude of the phase angle difference is greater than the predetermined value;
- introducing a time delay of about 1/60 second to about 5 seconds; and
- causing the relay to open one or more circuit breakers after the time delay so as to isolate the electrical generator from the electrical power grid.

18. The method for protecting an electrical generator as claimed in claim 9, and wherein the step of providing a synchronizing voltage signal from the electrical generator further comprises:
- providing a phase A voltage, a phase B voltage, and a phase C voltage from the electrical generator; and
- calculating a positive sequence voltage from the phase A, phase B, and phase C voltages.

19. The method for protecting an electrical generator as claimed in claim 9, and wherein the step of providing a synchronizing voltage signal from the electrical generator further comprises providing a single phase voltage signal from the electrical generator.

20. The method for protecting an electrical generator as claimed in claim 9, and wherein the step of providing a synchronizing voltage signal from the electrical generator further comprises:
- providing a phase A voltage, a phase B voltage, and a phase C voltage from the electrical generator; and
- calculating an alpha voltage from the phase A, phase B, and phase C voltages using the formula:

$$V_\alpha = 2/3 \cdot [V_A - (V_B + V_C)/2] = V_s.$$

21. A method for protecting an electrical generator, comprising:
- providing an electrical generator, which is electrically coupled to and normally synchronously operated with an electrical power grid;
- providing a synchronizing signal time function from the electrical generator, and wherein the synchronizing signal time function is sinusoidal, and which has a frequency $f_s$;
- deriving a reference signal time function having a time duration of greater than about two cycles, and which is a periodic time function with a frequency substantially similar to $f_s$, and which is calculated by multiplying the amplitude of a previously calculated reference signal time function over the time duration by (x−1)/x, and wherein x is a number that lies within a range of about 4 to about 1000, and multiplying the amplitude of the synchronizing signal time function over the time period by 1/x, and summing the synchronizing signal time function multiplied by 1/x to the previously calculated reference signal time function multiplied by (x−1)/x;
- determining a phase angle difference between the synchronizing signal time function and the reference signal time function during the time duration; and electrically isolating the electrical generator from the electrical power grid if the magnitude of the phase angle difference is greater than a predetermined value.

22. A method for protecting an electrical generator as claimed in claim 21, and wherein the step of providing a synchronizing signal time function includes providing a synchronizing voltage signal, and wherein the step of deriving a reference signal time function includes deriving a reference voltage signal.

23. A method for protecting an electrical generator as claimed in claim 21, and wherein the step of providing a synchronizing signal time function includes providing a synchronizing current signal, and wherein the step of deriving a reference signal time function includes deriving a reference current signal.

24. A method for protecting an electrical generator, comprising:

provilding an electrical generator which is electrically coupled to and normally synchronously operated with an electrical power grid;

providing a synchronizing voltage signal $V_s(t)$ from the electrical generator, and wherein the synchronizing voltage signal is sinusoidal, and which has a frequency $f_s$, and which is derived from a single phase of the electrical generator;

calculating a reference voltage signal $V_r(t)$ using the formula:

$$V_r(t)=[V_r(t-1)\cdot(x-1)/x]+[V_s(t)\cdot 1/x],$$

and wherein x is a number that lies within a range of about 4 to about 1000;

detecting a zero crossing of the synchronizing voltage signal, and detecting a zero crossing of the reference voltage signal, and measuring a time difference $\Delta t$ between the zero crossing of the synchronizing voltage signal and the zero crossing of the reference voltage signal;

calculating a phase angle difference $\Phi$ between the synchronizing voltage signal and the reference voltage signal using the formula:

$$\Phi=360\cdot f_s\cdot \Delta t;$$

comparing the calculated phase angle difference to a predetermined value of about 20 to about 60 degrees;

energizing a relay if the calculated phase angle difference is greater than the predetermined value;

introducing a time delay of about 1/60 second to about 5 seconds following the determination that the calculated phase angle difference is greater than the predetermined value; and causing the relay to open one or more circuit breakers after the time delay so as to isolate the electrical generator from the electrical power grid.

* * * * *